United States Patent [19]

Yamanashi et al.

[11] Patent Number: 4,931,520
[45] Date of Patent: Jun. 5, 1990

[54] RANDOM COPOLYMER CONTAINING DERIVATIVE OF BICYCLO [2.2.1] HEPT-2-ENE COMPOUND

[75] Inventors: Teruaki Yamanashi; Hiroyuki Ozawa; Hitoshi Yuasa; Mitsuo Matsuno, all of Yokohama; Tetsuo Satoh, Tokyo, all of Japan

[73] Assignee: Nippon Oil Co., Ltd., Tokyo, Japan

[21] Appl. No.: 298,180

[22] Filed: Jan. 17, 1989

[30] Foreign Application Priority Data

Jan. 20, 1988 [JP] Japan ................... 63-10068

[51] Int. Cl.$^5$ ........................... C08F 2/06; C08F 32/04
[52] U.S. Cl. ..................... 526/281; 526/75; 526/169.2; 526/280; 525/210
[58] Field of Search ............. 526/169.2, 280, 281, 526/308, 75

[56] References Cited

U.S. PATENT DOCUMENTS 3,494,897 2/1970 Reding et al. ............... 526/281 X

OTHER PUBLICATIONS

European Patent Application No. 203,799, published Dec. 3, 1986 to Minami et al.

Hackh's Chemical Dictionary, J. Grant, (ed.), McGraw-Hill Co., N.Y., 199–200, 1969.

*Primary Examiner*—Joseph L. Schofer
*Assistant Examiner*—F. M. Teskin
*Attorney, Agent, or Firm*—Darby & Darby

[57] ABSTRACT

A random copolymer comprises recurring units each having the formula of;

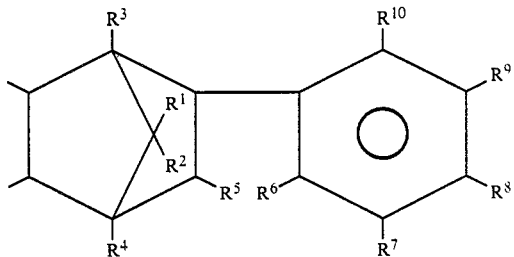

wherein $R^1$ to $R^{10}$ stand for a hydrogen atom or an alkyl group with or without $R^5$ being bonded to $R^6$ or $R^{10}$ via an alkylene group having 1 to 3 carbon atoms. The random copolymer contains 50 to 90 mol % of ethylene. The random copolymer has an intrinsic viscosity [$\eta$] of 0.3 to 10 dl/g measured in Decalin®, i.e., decahydronphthalene at 30° C.

15 Claims, No Drawings

RANDOM COPOLYMER CONTAINING DERIVATIVE OF BICYCLO [2.2.1] HEPT-2-ENE COMPOUND

BACKGROUND OF THE INVENTION

This invention relates to a random copolymer containing a derivative of a bicyclo [2. 2. 1] hept-2-ene compound, and a method for preparing same. More particularly, it relates to a random copolymer obtained by copolymerizing ethylene and a 5-aryl-bicyclo [2. 2. 1] hept-2-ene compound, hereafter abbreviated to ArBH, and a method for preparing same.

There are so far known polyethylene terephthalate, polycarbonate and polymethyl methacrylate, as plastics having excellent transparency. Polyethylene terephthalate, while being inexpensive and superior in thermal resistance and mechanical properties, has a drawback that it is vulnerable to strong acids or alkalis and subject readily to hydrolysis. Polycarbonate, while being superior in transparency, thermal resistance, thermal ageing resistance and impact resistance, has a drawback that it is inferior in resistance to chemicals such as strong alkalis. Polymethyl methacrylate, on the other hand, is inferior in resistance to solvents, thermal resistance and moisture proofness.

Most of the polyolefins are excellent in resistance to chemicals and solvents, and mechanical properties, but inferior in thermal resistance. Also, most of the polyolefins are crystalline and hence inferior in transparency.

The Japanese Unexamined Patent Publication No.168708/1985 discloses a random copolymer of ethylene and 1, 4, 5, 8-dimethano-1, 2, 3, 4, 4a, 5, 8, 8a-octahydronaphthalene, hereafter abbreviated to DMONs, and a method for producing same. However, the DMONs disclosed in this prior art are difficult to manufacture, and the copolymer of ethylene and DMONs is also difficult to manufacture industrially because the rate of polymerization is rather low.

SUMMARY OF THE INVENTION

It is a principal object of the present invention to provide a random copolymer that is excellent not only in optical properties, such as transparency and birifringency, but also in chemical properties, such as thermal resistance, thermal ageing properties, resistance to chemicals and solvents, mechanical properties such as toughness and impact resistance and electrical properties such as dielectric properties and corona resistance.

It is another object of the present invention to provide a method for preparing a random copolymer whereby the copolymer may be easily produced industrially.

These and other objects of the invention will become apparent from the following description.

According to the present invention, there is provided a random copolymer comprising:

(a) recurring units each having the formula of;

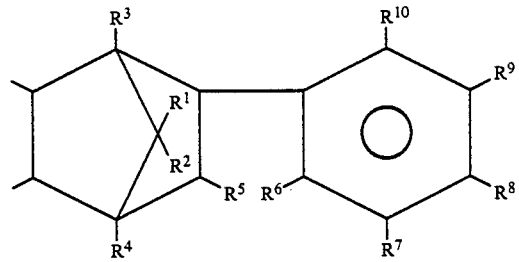

wherein $R^1$ to $R^{10}$ each represent the same or different atoms or groups and stand for a hydrogen atom or an alkyl group, with or without $R^5$ being bonded to $R^6$ or $R^{10}$ via an alkylene group having 1 to 3 carbon atoms, (b) the random copolymer being obtained by copolymerizing ethylene with a feed monomer material comprising a 5-aryl-bicyclo [2. 2. 1] hept-2-ene compound represented by the formula of;

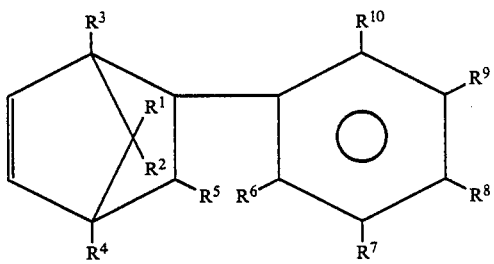

wherein $R^1$ to $R^{10}$ are the same as above, (c) the random copolymer containing 50 to 90 mol % of ethylene, (d) the random copolymer having an intrinsic viscosity [$\eta$] of 0.3 to 10 dl/g measured in Decalin ®, i.e., decahydronaphthalene at 30° C.

According to the present invention, there is also provided a method for producing a random copolymer comprising copolymerizing ethylene and a 5-aryl-bicyclo [2. 2. 1] hept-2-ene, compound represented by the formula of;

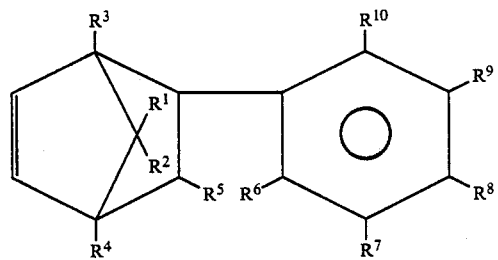

wherein $R^1$ to $R^{10}$ each represent the same or different atoms or groups and stand for a hydrogen atom or an alkyl group, with or without $R^5$ being bonded to $R^6$ or $R^{10}$ via an alkylene group having 1 to 3 carbon atoms, in a hydrocarbon solvent and in the presence of a catalyst containing an organoaluminum compound and a vanadium compound soluble in the hydrocarbon solvent.

PREFERRED EMBODIMENTS OF THE INVENTION

The present invention will be explained more in detail hereinbelow.

The random copolymer of the present invention is obtained by copolymerizing a feed monomer material mainly containing ethylene and 5-aryl-bicyclo [2. 2. 1] hept-2-ene compound, hereafter abbreviated to ArBH.

The ArBH employed in the random copolymer of the present invention is represented by the following formula (I):

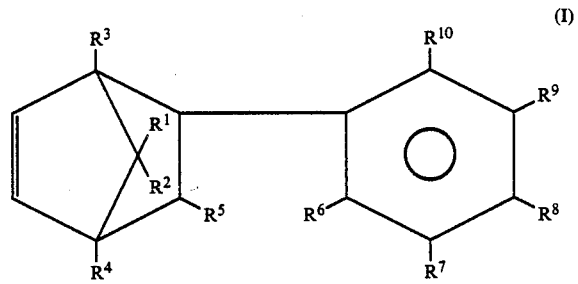

wherein $R^1$ to $R^{10}$ each represent the same or different atoms or groups and stand for a hydrogen atom or an alkyl group and wherein $R^5$ may be bonded to $R^6$ or $R^{10}$ via an alkylene group having 1 to 3 carbon atoms. It is not desirable that the number of carbon atoms in the alkylene group be not less than four since then the manufacture becomes difficult. The ArBH represented by the above formula (I) may be produced by, for example, the Diels-Alder reaction of an aromatic olefinic compound with cyclopentadienes or dicyclopentadienes, as shown by the following reaction schema:

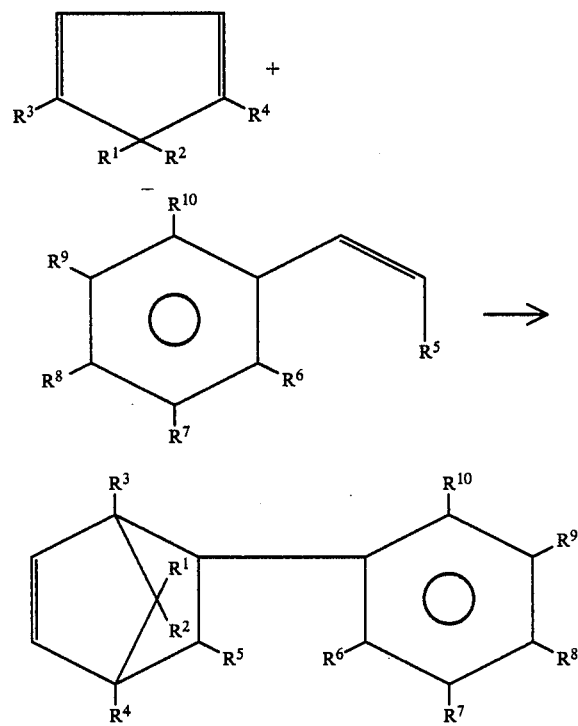

The aromatic olefinic compounds of the starting material may each have its unsaturated bond either included in a ring, as in the case of indene or dihydronaphthalene, or not included in a ring and attached to an aromatic ring, as in the case of styrene or α-methylstyrene. Examples of ArBH may include 5-phenyl-bicyclo [2. 2. 1] hept-2-ene, 5-o-tolyl-bicyclo [2. 2. 1] hept-2-ene, 5-m-tolyl-bicyclo [2. 2. 1] hept-2-ene, 5-p-tolyl-bicyclo [2. 2. 1] hept-2-ene, 5-o-ethylphenyl-bicyclo [2. 2. 1] hept-2-ene, 5-m-ethylphenyl-bicyclo [2. 2. 1] hept-2-ene, 5-p-ethylphenyl-bicyclo [2. 2. 1] hept-2-ene, 5-p-isopropylphenyl-bicyclo [2. 2. 1] hept-2-ene and 1,4-methano-1, 4, 4a, 9a-tetrahydrofluorene. Analyses with $^1$H-NMR and an IR spectrophotometer revealed that the aforementioned ArBH is mainly composed in the copolymer of recurring units each shown by the following formula (II):

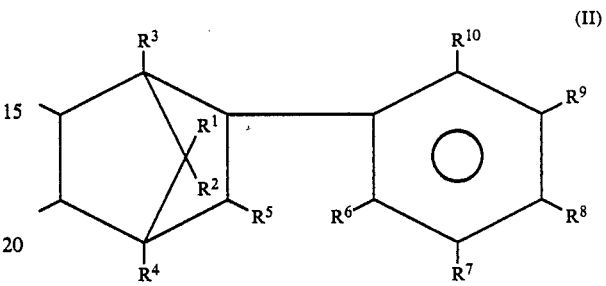

wherein $R^1$ to $R^{10}$ each represent the same or different atoms or groups and stand for a hydrogen atom or an alkyl group and wherein $R^5$ may be bonded to $R^6$ or $R^{10}$ via an alkylene group having 1 to 3 carbon atoms. The content of ArBH in the copolymer is 10 to 50 mol. % and preferably 20 to 50 mol. %.

The content of ethylene in the random copolymer of the present invention is 50 to 90 mol. % and preferably 50 to 80 mol. %.

The random copolymer of the present invention has a molecular weight represented by the intrinsic viscosity [η] in Decalin ®, i.e., decahydronaphthalene at 30° C. of 0.3 to 10 dl/g.

The random copolymer of the present invention is generally amorphous or of low crystallinity and exhibits superior transparency. In general, it has a degree of crystallinity of not higher than 5% when measured with X rays, while demonstrating no melting point when measured with a differential scanning calorimeter (DSC).

It is preferred that the random copolymer of the present invention have the glass transition temperature (Tg) of 80° to 220° C., when measured by a thermomechanical analyzer.

In the random copolymer of the present invention, comonomers copolymerizable with ArBH and ethylene, such as bicycloheptenes other than ArBH, α-olefins having not less than 3 and preferably 3 to 12 carbon atoms or olefins containing aromatic compounds, may be contained in 10 mol % or lower based on one mole of ArBH as long as they are in meeting with the objective of the present invention. Examples of those copolymerizable comonomers may include α-olefins having not less than 3 carbon atoms, such as propylene, 1-butene, 3-methyl-1-butene, 1-pentene, 1-hexene or 1-decene, aromatic olefins such as styrene, α-methylstyrene, or bicycloheptenes, such as bicycloheptene, methylbicycloheptene, ethylbicycloheptene, 2, 3, 3a, 4, 7, 7a-hexahydro-4, 7-methano-1H-indene, 5-ethylidenebicyclo [2. 2. 1] hept-2-ene.

For producing the random copolymer of the present invention, the ArBH and ethylene may be copolymerized, occasionally with the aforementioned comonomers, in a hydrocarbon solvent and in the presence of a catalyst containing an organoaluminum compound and a vanadium compound soluble in the hydrocarbon solvent. The vanadium compounds may be enumerated for example by $VCl_4$, $VBr_4$, $VOCl_3$, $VOBr_3$ or $VO(OR)_3$ where R stands for a hydrocarbon group containing 1 to 20 and preferably 1 to 8 carbon atoms, or $VO(OR)_nX_{3-n}$ where R stands for a hydrocarbon group containing 1 to 20 and preferably 1 to 8 carbon atoms, X stands for a halogen and $0 \leq n < 3$. Above all, $VO(OR)_nX_{3-n}$ or a mixture of $VO(OR)_3$ with vanadium oxyhalogenides, such as $VOCl_3$ or $VOBr_3$ are most preferred. The organoaluminum compounds, employed as the other catalytic component, are represented by the formula $R'_mAlX'_{3-m}$ where R' stands for an aliphatic or alicyclic hydrocarbon residue having 1 to 20 and preferably 1 to 8 carbon atoms, X' stands for a halogen and $0 < m \leq 3$. Examples of these organoaluminum compounds may include for example trialkylaluminum, such as trimethylaluminum, triethylaluminum, triisobutylaluminum or tricyclohexylaluminum, dialkylaluminum halides, such as diethylaluminum chloride, diethylaluminum bromide or diethylaluminum iodide, alkylaluminum dihalides, such as ethylaluminum dichloride, ethylaluminum dibromide or ethylaluminum diiodide, or alkylaluminum sesquihalides, such as ethylaluminum sesquichloride, ethylaluminum sesquibromide or ethylaluminum sesquiiodide. These compounds may be used singly or as a combination in any desired ratio.

The molar ratio of the organoaluminum compounds to the vanadium compounds is preferably 2 to 30 and more preferably 2 to 20.

The catalytic components in the copolymerization reaction are preferably adjusted so that the concentration of the vanadium compound is in the range from 0.1 to 20 millimol/liter and that of the alkylaluminum compound is in the range from 0.2 to 600 and desirably from 0.2 to 400 millimol/liter so that the above condition of the molar ratio is satisfied. Although the concentration of ArBH and that of ethylene in the reaction medium vary depending on particular reaction media, reaction temperatures or desired copolymer compositions, the concentration of ArBH may preferably be in the range of 0.05 to 4 mol/liter. With an excessively high concentration of ethylene, a polymer consisting only of ethylene is by-produced so that the concentration of ethylene may preferably be adjusted such that the concentration of ethylene is from a hundredth to one time that of ArBH.

The aforementioned copolymerization reaction may be carried out by slurry or solution polymerization, by using a hydrocarbon solvent. Examples of the hydrocarbon solvents may include hexane, heptane, octane, cyclohexane, benzene, toluene or xylene. In the copolymerization reaction, the polymerization temperature is preferably adjusted to $-30°$ C. to $80°$ C., while the polymerization pressure is preferably adjusted to 0.1 to 50 kg/cm$^2$ (absolute pressure). A molecular weight adjustment agent, such as hydrogen, may be used simultaneously for adjusting the molecular weight of the copolymer.

The random copolymer of the present invention may be molded and/or processed by any methods known in the art. The processing may be carried out using any known additives, such as, for example, antioxidants, photostabilizers, antistatic agents, anti-hazing agents, lubricants, anti-blocking agents, fillers or colorants.

The random copolymer of the present invention may be employed as a blend with various polymers known in the art. These polymers may be enumerated by, for example, polyolefins, such as polyethylene, polypropylene, polybutene-1, poly-4-methyl-1-pentene, polyisoprene, polybutadiene, polystyrene, ethylene-propylene copolymer, styrene-butadiene copolymer, ternary copolymers of ethylene and propyrene with 5-ethylidenebicyclo [2. 2. 1] hept-2-ene or dienes such as dicyclopentadiene, 2-alkylidene-1, 4, 5, 8-dimethano-1, 2, 3, 4, 4a, 5, 8, 8a-octahydronaphthalene or 1, 4-hexadiene, halogenated vinyl polymers, such as polyvinyl chloride, polyvinylidene chloride or polyvinyl fluoride, polar vinyl polymers, such as polyacrylates, polymethacrylates, polyacrylonitrile, polyvinyl alcohols or polyvinyl acetate, polyacetals, polyphenylene oxides, polycarbonates, polysulfones, polyesters or polyamides.

EXAMPLES OF THE INVENTION

The present invention will be explained with reference to specific Examples. It should be noted that these Examples are given only for the sake of illustration and are not intended for limiting the scope of the invention.

EXAMPLE 1

A flask having four inlets and a capacity of 1 liter was thoroughly dried and equipped with a stirrer, a gas blowing tube, a thermometer and a three-way cock, and the atmosphere within the flask was replaced thoroughly by nitrogen.

800 milliliters of toluene, free of water, were charged into this flask and there were added under nitrogen 1.6 millimol of vanadyl chloride, 21.4 gram of 5-phenyl-bicyclo [2. 2. 1] hept-2-ene and 16 millimol of ethylaluminum sesquichloride.

A mixed gas containing ethylene and nitrogen was introduced via the gas blowing tube and passed to the flask maintained at 10° C. for 40 minutes at a rate of 32 liters per hour of ethylene and at a rate of 128 liters per hour of nitrogen.

The copolymerization reaction proceeded under the homogeneous and transparent state and no polymers were seen to be precipitated.

10 milliliters of methanol were then added to the reaction system to terminate the copolymerization reaction.

After termination of the reaction, the polymerization liquid was poured into isopropanol containing 0.05% hydrochloric acid to precipitate the copolymer. The precipitated copolymer was separated, washed with isopropanol and dried overnight to give 19.9 g of the copolymer.

The intrinsic viscosity $[\eta]$, when measured in decalin at 30° C., amounted to 1.4. Also the $^1$H-NMR analysis revealed that 26% of 5-phenyl-bicyclo [2. 2. 1] hept-2-ene was contained in the copolymer.

The glass transition temperature (Tg), when measured by a thermomechanical analyzer, manufactured and sold by Shimazu Corp. under the trade name of Model TMA DT-30, was 142° C. Also the analysis with a differential scanning calorimeter manufactured and sold under the trade name of DSC-20 by Seiko Denshi Kogyo KK, revealed no heat absorption indicating that the melting point (Tm) of the copolymer was involved in the reaction.

The light transmittance at 830 nm was found to be 92%.

EXAMPLE 2

The polymerization procedure was carried out in the same way as in Example 1 except that a vanadyl chloride/vanadyl ethoxide mixture having a molar ratio of vanadyl chloride to vanadyl ethoxide of 1:1 was used in place of vanadyl chloride as the catalyst. In this manner, 17.1 g of the copolymer was obtained. The $^1$H-NMR analysis revealed that 30 mol. % of 5-phenyl-bicyclo [2. 2. 1] hept-2-ene was contained in the copolymer. The intrinsic viscosity [$\eta$] in Decalin®, i.e., decahydronaphthalene at 30° C. was found to be 1.8 and the glass transition temperature (Tg) was found to be 148° C. The DSC analysis revealed that the copolymer showed no melting point (Tm).

The light transmittance of the copolymer at 830 nm was found to be 92%.

EXAMPLE 3

The polymerization procedure was carried out in the same way as in Example 1 except that vanadyl ethoxide was used in place of vanadyl chloride as the catalyst. In this manner, 14.4 g of the copolymer was obtained. The $^1$H-NMR analysis revealed that 27 mol. % of 5-phenyl-bicyclo [2. 2. 1] hept-2-ene was contained in the copolymer. The intrinsic viscosity [$\eta$] in Decalin®, i.e., decahydronaphthalene at 30° C. was found to be 0.9 and the glass transition temperature (Tg) was found to be 143° C. The DSC analysis revealed that the copolymer showed no melting point (Tm).

EXAMPLE 4

The polymerization procedure was carried out in the same way as in Example 2 except that 5-p-tolyl-bicyclo [2. 2. 1] hept-2-ene was used in place of 5-phenyl-bicyclo [2. 2. 1] hept-2-ene. In this manner, 15.3 g of a copolymer was obtained. The $^1$H-NMR analysis revealed that 29 mol. % of 5-p-tolyl-bicyclo [2. 2. 1] hept-2-ene was contained in the copolymer. The intrinsic viscosity [$\eta$] in Decalin®, i.e., decahydronaphthalene at 30° C. was found to be 1.3 and the glass transition temperature (Tg) was found to be 150° C. The DSC analysis revealed that the copolymer showed no melting point (Tm).

The light transmittance of the copolymer at 830 nm was found to be 89%.

EXAMPLE 5

The polymerization procedure was carried out in the same way as in Example 2 except that 1, 4-methano-1, 4, 4a, 9a-tetrahydrofluorene was used in place of 5-phenyl-bicyclo [2. 2. 1] hept-2-ene. In this manner, 19.3 g of a copolymer was obtained. The $^1$H-NMR analysis revealed that 26 mol. % of 1, 4-methano-1, 4, 4a, 9a-tetrahydrofluorene was contained in the copolymer. The intrinsic viscosity [$\eta$] in Decalin®, i.e., decahydronaphthalene at 30° C. was found to be 1.3 and the glass transition temperature (Tg) was found to be 139° C. The DSC analysis revealed that the copolymer showed no melting point (Tm).

The light transmittance of the copolymer at 830 nm was found to be 90%.

From the foregoing, it is seen that the present invention provides a random copolymer that is superior in fundamental properties including light transmission, thermal resistance, thermal ageing resistance, resistance to chemicals, resistance to solvents, dielectric properties and mechanical properties, and that can be produced easily on an industrial basis, and the method for producing the same.

The random copolymer of the present invention is superior not only in transparency and thermal resistance, but also superior in mechanical and dielectric properties, resistance to chemicals and resistance to solvents, since it is free from components containing polar groups. Thus, the random copolymer of the present invention may be utilized in optical fields, such as optical disks, optical lenses, optical fibers, LEDs or window panes, in electrical fields such as housings for microwave ovens or cassette tapes or lamp shades, or in medical and chemical fields, such as syringes, bottles or pipets.

Although the present invention has been described with reference to the specific examples, it should be understood that various modifications and variations can be easily made by those skilled in the art without departing from the spirit of the invention. Accordingly, the foregoing disclosure should be interpreted as illustrative only and is not to be interpreted in a limiting sense. The present invention is limited only by the scope of the following claims.

What is claimed is:

1. A random copolymer comprising:
   (a) recurring units each having the formula of:

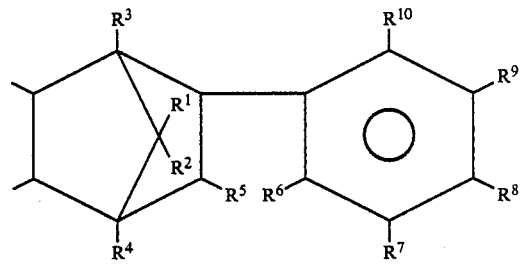

wherein $R^1$ to $R^{10}$ each represent the same or different atoms or groups and stand for a hydrogen atom or an alkyl group with or without $R^5$ being bonded to $R^6$ or $R^{10}$ via an alkylene group having 1 to 3 carbon atoms, (b) said random copolymer being obtained by copolymerizing ethylene with a feed monomer material comprising a 5-aryl-bicyclo [2.2.1] hept-2-ene compound represented by the formula of:

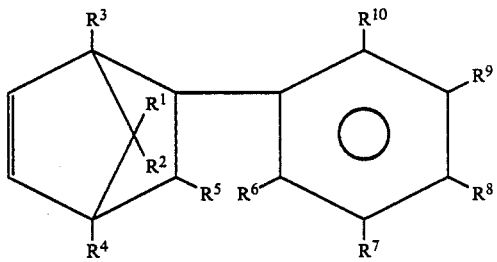

wherein $R^1$ to $R^{10}$ are the same as above,
   (c) said random copolymer containing 50 to 90 mol % of ethylene,
   (d) said random copolymer having an intrinsic viscosity [$\eta$] of 0.3 to 10 dl/g measured in decahydronophthalene at 30° C., and
   (e) said random copolymer having a glass transition temperature (Tg) of 80° to 220° C. measured by a thermomechanical analyzer.

2. The random copolymer according to claim 1 wherein said 5-aryl-bicyclo [2. 2. 1] hept-2-ene compound is selected from the group consisting of 5-phenyl-bicyclo [2. 2. 1] hept-2-ene, 5-o-tolyl-bicyclo [2. 2. 1]

hept-2-ene, 5-m-tolyl-bicyclo [2. 2. 1] hept-2-ene, 5-p-tolyl-bicyclo [2. 2. 1] hept-2-ene, 5-o-ethylphenyl-bicyclo [2. 2. 1] hept-2-ene, 5-m-ethylphenyl-bicyclo [2. 2. 1] hept-2-ene, 5-p-ethylphenyl-bicyclo [2. 2. 1] hept-2-ene, 5-p-isopropylphenyl-bicyclo [2. 2. 1] hept-2-ene, 1, 4-methano-1, 4, 4a, 9a-tetrahydrofluorene and mixtures thereof.

3. The random copolymer according to claim 1 further comprising not more than 10 mol %, based on mole of the 5-aryl-bicyclo [2. 2. 1] hept-2-ene compound, of a comonomer selected from the group consisting of α-olefins having not less than 3 carbon atoms, aromatic olefins, bicycloheptenes and mixtures thereof.

4. The random copolymer according to claim 3 wherein said comonomer is selected from the group consisting of propylene, 1-butene, 3-methyl-1-butene, 1-pentene, 1-hexene, 1-decene, styrene, α-methylstyrene, bicycloheptene, methylbicycloheptane, ethylbicycloheptane, 2, 3, 3a, 4, 7, 7a-hexahydro-4, 7-methano-1H-indene, 5-ethylidenebicyclo [2. 2. 1] hept-2-ene, and mixtures thereof.

5. The random copolymer according to claim 1 having a degree of crystallinity measured by X rays of not more than 5% and exhibiting no melting point measured by a differential scanning calorimeter.

6. A method for preparing a random copolymer comprising copolymerizing ethylene and a 5-aryl-bicyclo [2. 2. 1] hept-2-ene compound represented by the formula of;

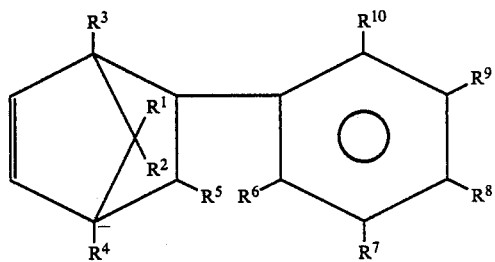

wherein $R^1$ to $R^{10}$ each represent the same or different atoms or groups and stand for a hydrogen atom or an alkyl group with or without $R^5$ being bonded to $R^6$ or $R^{10}$ via an alkylene group having 1 to 3 carbon atoms, in a hydrocarbon solvent and in the presence of a catalyst containing an organoaluminum compound and a vanadium compound soluble in the hydrocarbon solvent.

7. The method according to claim 6 wherein said vanadium compound is selected from the group consisting of $VCl_4$, $VBr_4$, $VOCl_3$, $VOBr_3$ and $VO(OR)_3$, R indicating a hydrocarbon group having 1 to 20 carbon atoms, $VO(OR)_nX_{3-n}$, R indicating a hydrocarbon group having 1 to 20 carbon atoms, X indicating a halogen and $0 \leq n < 3$, and mixtures thereof.

8. The method according to claim 6 wherein said organoaluminum compound has the formula of $R'_mAlX'_{3-m}$, R' indicating an aliphatic or alicyclic hydrocarbon residue having 1 to 20 carbon atoms, X' indicating a halogen and $0 < m \leq 3$.

9. The method according to claim 8 wherein said organoaluminum compound is selected from the group consisting of trimethyl aluminum, triethyl aluminum, triisobutyl aluminum, tricyclohexyl aluminum, diethyl aluminum chloride, diethyl aluminum bromide, diethyl aluminum iodide, ethyl aluminum dichloride, ethyl aluminum dibromide, ethyl aluminum diiodide, ethyl aluminum sesquichloride, ethyl aluminum sesquibromide, ethyl aluminum sesquiiodide and mixtures thereof.

10. The method according to claim 6 wherein the molar ratio of the organoaluminum compound to the vanadium compound is in the range of 1:2 to 30.

11. The method according to claim 6 wherein the concentration of said vanadium compound in the hydrocarbon solvent ranges from 0.1 to 20 millimol/liter.

12. The method according to claim 6 wherein the concentration of said 5-aryl-bicyclo [2. 2. 1] hept-2-ene compound in the hydrocarbon solvent ranges from 0.05 to 4 mol/liter.

13. The method according to claim 12 wherein the concentration of ethylene is 0.01 to 1 time that of the 5-aryl-bicyclo [2. 2. 1] hept-2-ene compound.

14. The method according to claim 6 wherein said hydrocarbon solvent is selected from the group consisting of hexane, heptane, octane, cyclohexane, benzene, toluene, xylene and mixtures thereof.

15. The method according to claim 6 wherein the copolymerization is carried out at a temperature of $-30°$ C. to $80°$ C. and under a pressure of 0.1 to 50 kg/cm$^2$ in terms of absolute pressure.

* * * * *